US012659006B2

(12) United States Patent　　(10) Patent No.:　US 12,659,006 B2

Jang et al.　　(45) Date of Patent:　Jun. 16, 2026

---

(54) METHOD OF PERFORMING ANTI-JAMMING TECHNIQUES THROUGH ANTENNA BEAM HOPPING IN COMMUNICATION SYSTEMS IMPLEMENTED BY USING PLURALITY OF RELAY AND ELECTRONIC APPARATUS THEREOF

(71) Applicant: AGENCY FOR DEFENSE DEVELOPMENT, Daejeon (KR)

(72) Inventors: Myung Jin Jang, Daejeon (KR); Ju Hyung Lee, Daejeon (KR); Jae Won Choi, Daejeon (KR); Chul Hee Choi, Daejeon (KR); Hak Keum Seo, Daejeon (KR); Ki Keun Kim, Daejeon (KR); Byung Seok Woo, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 411 days.

(21) Appl. No.: 18/367,618

(22) Filed: Sep. 13, 2023

(65) Prior Publication Data

US 2024/0348312 A1　　Oct. 17, 2024

(30) Foreign Application Priority Data

Apr. 13, 2023　(KR) ........................ 10-2023-0048753

(51) Int. Cl.
　*H04B 7/06*　　(2006.01)
　*H04B 7/195*　　(2006.01)
(52) U.S. Cl.
　CPC ......... *H04B 7/06952* (2023.05); *H04B 7/195* (2013.01)
(58) Field of Classification Search
　CPC .... H04B 7/06952; H04B 7/195; H04B 7/185; H04B 7/18513; H04B 7/18517;

(Continued)

(56) References Cited

U.S. PATENT DOCUMENTS 10,103,800 B2　10/2018　Kang et al.
2006/0140251 A1 *　6/2006　Brown ................. H04B 1/7143

(Continued)

FOREIGN PATENT DOCUMENTS

CN　　107332606 A　*　11/2017　......... H04L 27/2614
CN　　116828394 A　*　9/2023

(Continued)

OTHER PUBLICATIONS

Notice of Reasons for Rejection issued Jul. 24, 2024 in corresponding Korean Application No. 10-2023-0048753.

(Continued)

*Primary Examiner* — Lana N Le
(74) *Attorney, Agent, or Firm* — MILES & STOCKBRIDGE P.C.

(57)　　　　　ABSTRACT

Provided is an electronic apparatus of performing communication through a communication system implemented using a plurality of relays, the electronic apparatus including a beam shaping module that shapes a beam for transmitting and receiving data, an antenna aligned to transmit and receive a beam shaped by the beam shaping module, a transceiver for transmitting and receiving the data in relation to another electronic apparatus through the antenna, and at least one processor configured to determine a beam hopping pattern between the plurality of relays, change a relay, which is used to transmit and receive data in relation to the another electronic apparatus sharing the beam hopping pattern, from a first relay included in the plurality of relays to a second relay included in the plurality of relays based on the beam hopping pattern, and control at least one of the antenna, the beam shaping module and the transceiver to transmit and receive data through the second relay. According to another example embodiment, a method executed through the electronic apparatus may be provided and a computer readable (Continued)

recording medium having instructions for performing the method may also be provided.

9 Claims, 3 Drawing Sheets

(58) Field of Classification Search
CPC ...... H04B 7/2041; H04B 7/2606; H04B 7/14; H04B 1/7143; H04B 7/0617; H04K 3/226; H04K 3/25; H04K 3/00; H04K 3/255; H04K 2203/32; H04W 48/20
See application file for complete search history.

(56) References Cited

U.S. PATENT DOCUMENTS

| | | | |
|---|---|---|---|
| 2018/0309523 A1 | 10/2018 | Chongoushian | |
| 2019/0191397 A1* | 6/2019 | Pan | H04W 56/001 |
| 2019/0200337 A1* | 6/2019 | Zhou | H04B 7/0617 |
| 2024/0291145 A1* | 8/2024 | Dankberg | H04B 7/18541 |
| 2024/0426977 A1* | 12/2024 | Fernando | H04K 3/226 |
| 2025/0080214 A1* | 3/2025 | Ravishankar | H04W 48/20 |
| 2025/0280302 A1* | 9/2025 | Wang | H04L 5/00 |

FOREIGN PATENT DOCUMENTS

| | | | | | |
|---|---|---|---|---|---|
| EP | 2833558 | B1 * | 12/2015 | ......... | H04L 25/0204 |
| KR | 2001-0046952 | A | 6/2001 | | |
| KR | 20160026091 | A * | 3/2016 | .......... | H04B 7/0617 |
| KR | 10-1733174 | B1 | 5/2017 | | |
| KR | 2019-0053172 | A | 5/2019 | | |
| KR | 2019-0140006 | A | 12/2019 | | |
| KR | 10-2490315 | B1 | 1/2023 | | |

OTHER PUBLICATIONS

Rui Han et al., "A Secure Architecture of Relay-Aided Space Information Networks", IEEE Network, vol. 55, 2021, pp. 88-94.
Honglin Hu et al., "Radio Resource Management for Cooperative Wireless Communication Systems with Organized Beam-Hopping Techniques", IEEE Wireless Communications, vol. 14, 2008, pp. 100-109.

* cited by examiner

METHOD OF PERFORMING ANTI-JAMMING TECHNIQUES THROUGH ANTENNA BEAM HOPPING IN COMMUNICATION SYSTEMS IMPLEMENTED BY USING PLURALITY OF RELAY AND ELECTRONIC APPARATUS THEREOF

PRIORITY INFORMATION

This application claims the benefit of Korean Patent Application No. 10-2023-0048753 filed on Apr. 13, 2023 in the Korean Intellectual Property Office, which is incorporated herein by reference in its entirety.

FIELD OF THE INVENTION

Example embodiments relate to anti-jamming techniques used for communication systems. Specifically, example embodiments relate to anti-jamming techniques that can be properly utilized in micro-miniature relay communication systems.

DESCRIPTION OF THE RELATED ART

Communication systems via relays such as communication satellites or relay drones between transmitting and receiving terminals are used in various fields thanks to the advantage of overcoming geographic/spatial limitations. In military communication systems, it is possible to expand the operational area and secure connectivity among terminals through various relay communication systems. On the other hand, if an enemy enacts jamming attacks on a relay electronic apparatus and disables the relay electronic apparatus, there is a weakness in that the entire communication system is incapacitated. Thus, in the case of satellite communication systems, which are representative relay communication systems, high-spec/expensive military communications relays with special functions that can eliminate enemy jamming signals are applied.

As communication parts are miniaturized through rapid technological development, communication equipment and relay equipment are made cheap and small. In military communication, the use of cheap and small communication/relay equipment is gradually expanding according to the trend of technological development. In particular, relay electronic apparatuses of military communication systems are often located in the air or space in a military communication environment, and inexpensive and compact communication relay electronic apparatuses that operate in air and space environments are being developed. However, there is a problem that it is not suitable to add an anti-jamming function because the size of a small communication relay electronic apparatus operated in the air or space is small and power consumption is low.

SUMMARY OF THE INVENTION

Accordingly, the present invention is directed to anti-jamming techniques based on antenna beam hopping technology so that the anti-jamming techniques may be applied on communications relay systems using small relays.

According to an aspect, there is provided an electronic apparatus of performing communication through a communication system implemented using a plurality of relays, the electronic apparatus including a beam shaping module that shapes a beam for transmitting and receiving data, an antenna aligned to transmit and receive a beam shaped by the beam shaping module, a transceiver for transmitting and receiving the data in relation to another electronic apparatus through the antenna, and at least one processor configured to determine a beam hopping pattern between the plurality of relays, change a relay, which is used to transmit and receive data in relation to the another electronic apparatus sharing the beam hopping pattern, from a first relay included in the plurality of relays to a second relay included in the plurality of relays based on the beam hopping pattern, and control at least one of the antenna, the beam shaping module and the transceiver to transmit and receive data through the second relay.

According to an example embodiment, the at least one processor may control at least one of the antenna and the beam shaping module to transmit a beam for performing uplink beam hopping, which is for changing a relay for transmitting the data to the another electronic apparatus, from the first relay to the second relay based on the beam hopping pattern.

According to an example embodiment, the electronic apparatus may further include a relay location tracking apparatus for obtaining location information of the plurality of relays.

According to an example embodiment, the at least one processor may control at least one of the beam shaping module and the antenna based on the location information obtained through the relay location tracking apparatus and the beam hopping pattern.

According to an example embodiment, the beam hopping pattern used to communicate with the another electronic apparatus and timing at which a beam hops according to the beam hopping pattern may be shared with the another electronic apparatus.

According to an example embodiment, the at least one processor may determine one relay among the plurality of relays as the second relay based on the beam hopping pattern, and may control the beam shaping module in order to shape a beam based on at least one of an identifier of the second relay and location information of the second relay.

According to an example embodiment, the at least one processor may control the antenna to direct a beam shaped by the beam shaping module to the second relay.

According to an example embodiment, the at least one processor may control the transceiver to transmit the data to the another electronic apparatus through the antenna directing the second relay.

According to an example embodiment, the antenna may be a phased array antenna.

According to an example embodiment, the plurality of relays may be relays for low earth orbit (LEO) satellite communications.

According to another aspect, there is provided a method for a first electronic apparatus to perform communication through a communication system implemented using a plurality of relays, the method including determining a beam hopping pattern that is a pattern for changing a first relay, which is a relay used to transmit and receive data in relation to a second electronic apparatus and included in the plurality of relays, to another relay included in the plurality of relays, based on the beam hopping pattern, changing the first relay, which is a relay used to transmit and receive data in relation to the second electronic apparatus, to a second relay that is one relay among the plurality of relays, shaping a beam for communication with the second electronic apparatus through the second relay, aligning an antenna to transmit and receive data based on the shaped beam, and transmitting and receiving the data with the second electronic apparatus through the second relay, using the antenna, wherein the beam hopping pattern may be shared with the second electronic apparatus.

According to the right above aspect, there is provided a non-transitory computer readable recording medium having a computer program for executing the method.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

According to the example embodiments, it is possible to have an effect of lowering the probability that electronic apparatuses performing communication are affected by jamming, with that electronic apparatuses located on the ground perform communication via a plurality of relays using the technology of the example embodiments, through increasing the difficulty of the jammer's jamming attack.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Figure 1:
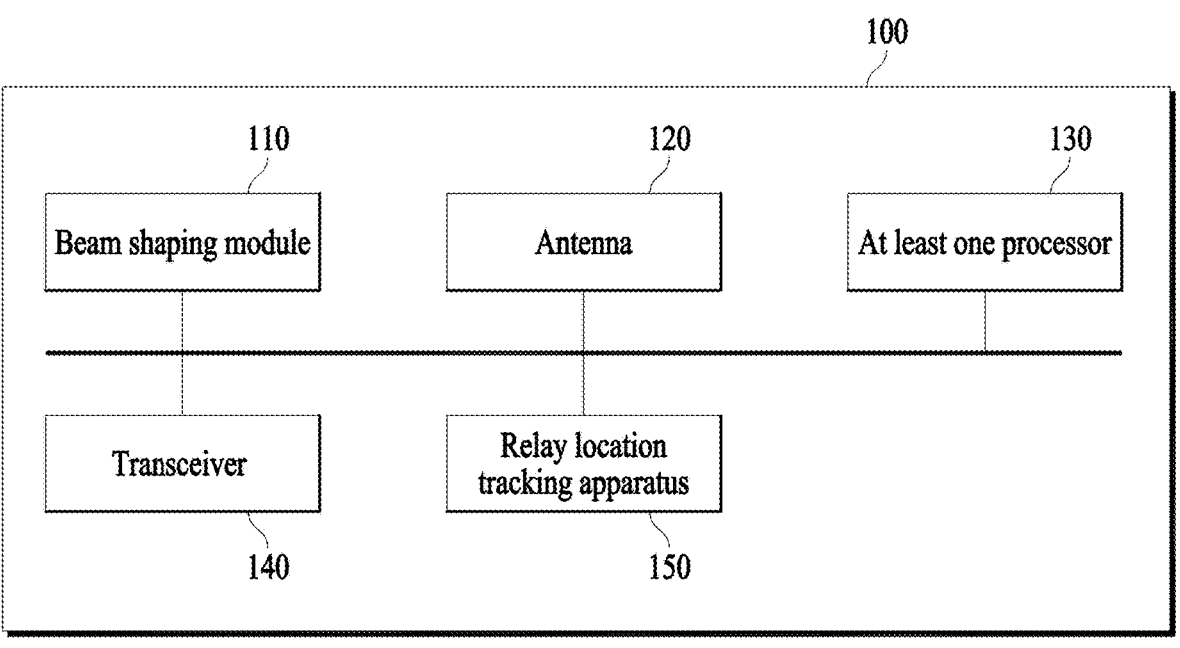
FIG. 1 shows a block diagram of an electronic apparatus according to an example embodiment.

Terms used in the example embodiments are selected from currently widely used general terms when possible while considering the functions in the present disclosure. However, the terms may vary depending on the intention or precedent of a person skilled in the art, the emergence of new technology, and the like. Further, in certain cases, there are also terms arbitrarily selected by the applicant, and in such cases, the meaning will be described in detail in the corresponding descriptions. Therefore, the terms used in the present disclosure should be defined based on the meaning of the terms and the contents of the present disclosure, rather than the simple names of the terms.

Throughout the specification, when a part is described as "comprising or including" a component, it does not exclude another component but may further include another component unless otherwise stated. Furthermore, terms such as " . . . unit," " . . . group," and " . . . module" described in the specification mean a unit that processes at least one function or operation, which may be implemented as hardware, software, or a combination thereof.

Expression "at least one of a, b and c" described throughout the specification may include "a alone," "b alone," "c alone," "a and b," "a and c," "b and c" or "all of a, b and c."

An "electronic apparatus" referred to below may include various electronic apparatuses that access a server or another terminal through a network, such as a computer or a portable terminal. For example, the electronic apparatus may be implemented as various military communication apparatuses that perform wireless communication through an antenna. For another example, the electronic apparatus may include, for example, a notebook, a desktop computer, and/or a laptop computer which are equipped with a web browser. The portable terminal may be a wireless communication apparatus ensuring portability and mobility, and include (but is not limited to) any type of handheld wireless communication apparatus, for example, a tablet PC, a smartphone, a communication-based terminal such as international mobile telecommunication (IMT), code division multiple access (CDMA), W-code division multiple access (W-CDMA), long term evolution (LTE), or the like.

Hereinafter, example embodiments of the present disclosure will be described in detail with reference to the accompanying drawings so that those of ordinary skill in the art to which the present disclosure pertains may easily implement them. However, the present disclosure may be implemented in multiple different forms and is not limited to the example embodiments described herein.

It will be understood that each block of a flowchart diagram and a combination of the flowchart diagrams may be performed by computer program instructions. The computer program instructions may be embodied in a processor of a general-purpose computer or a special purpose computer, or may be embodied in a processor of other programmable data processing equipment. Thus, the instructions, executed via a processor of a computer or other programmable data processing equipment, may generate a part for performing functions described in the flowchart blocks. To implement a function in a particular manner, the computer program instructions may also be stored in a computer-usable or computer-readable memory that may direct a computer or other programmable data processing equipment. Thus, the instructions stored in the computer usable or computer readable memory may be produced as an article of manufacture containing an instruction part for performing the functions described in the flowchart blocks. The computer program instructions may be embodied in a computer or other programmable data processing equipment. Thus, a series of operations may be performed in a computer or other programmable data processing equipment to create a computer-executed process, and the computer or other programmable data processing equipment may provide steps for performing the functions described in the flowchart blocks.

Additionally, each block may represent a module, a segment, or a portion of code that includes one or more executable instructions for executing a specified logical function(s). It also is noted that in some alternative implementations the functions recited in the blocks may occur out of order. For example, two blocks shown one after another may be performed substantially at the same time, or the blocks may sometimes be performed in the reverse order according to a corresponding function.

FIG. 1 shows a block diagram of an electronic apparatus 100 according to an example embodiment.

According to an example embodiment, the electronic apparatus 100 may perform a method for performing communication through a communication system implemented using a plurality of relays. For this, the electronic apparatus 100 may include a beam shaping module 110 for shaping a beam for transmitting and receiving data, an antenna 120 aligned to transmit and receive a beam shaped by the beam shaping module 110, a transceiver 140 that transmits and receives data in relation to another electronic apparatus through the antenna 120, and at least one processor 130 that determines beam hopping patterns among a plurality of relays and controls at least one of the beam shaping module 110, the antenna 120 and the transceiver 140 to transmit and receive data with the another electronic apparatus that shares the beam hopping patterns.

The beam shaping module 110 according to an example embodiment is an element for using technology that beam shaping or beam forming concentrates a beam of an antenna to a specific receiving apparatus in wireless communication. A plurality of antennas may be required to transmit beams by beam shaping implemented by the beam shaping module 110, and the technology in which multiple antennas are implemented in both a transmitter and a receiver may be referred to as multi input multi output (MIMO). A method for beam shaping may be implemented through various methods that can be performed to perform directional communication.

In a wireless communication system used by the electronic apparatus 100 to communicate, a case in which beam shaping is used at a transmitting end may be referred to as uplink beam shaping, and a case in which beam shaping is used at a receiving end may be referred to as downlink beam shaping. According to an example embodiment, the beam shaping module 110 of the electronic apparatus 100 may be configured to perform uplink beam shaping for communication with another electronic apparatus to be communicated with. According to an example embodiment, another electronic apparatus that will receive data through the electronic apparatus 100 through uplink beam shaping may also include at least some of the same elements as those included in the electronic apparatus 100, and may transmit/receive data with the electronic apparatus 100 in a corresponding method.

The antenna 120 according to the example embodiment is an element for transmitting a beam toward a receiving end through a beam shaped by the beam shaping module 110 or receiving a beam from another electronic apparatus. According to an example embodiment, the antenna 120 is a type of antenna used for satellite communication and the antenna 120 may be a phased array antenna. According to an example embodiment, the antenna 120 may be composed of a plurality of antennas that electronically change a phase or signal delay in order to control a directional beam shaped by the beam shaping module 110. Through this, the antenna 120 may receive and transmit information of a designated bandwidth in a specific range of frequencies with a specific gain. The antenna 120 may be focused on the desired orbital plane in which a designated relay operates, rather than over the entire space, and accordingly, the antenna 120 may be usefully utilized for wireless communication through a relay such as a satellite.

According to an example embodiment, the antenna 120 may include a radiating element array in which an assembly of radiating elements is geometrically (mechanically or electrically) arranged, and the antenna 120 may transmit and receive a beam with a spatially desired radiation pattern by electrically changing the current phase for the radiating elements. According to an example embodiment, an element such as a phase shifter for changing the phase of the current applied to the array of radiating elements of the antenna 120 may be included. As the technology of the antenna 120 implemented as a phased array antenna, various technologies applied to antennas suitable for wireless communication through uplink beam shaping may be applied.

According to an example embodiment, at least one processor 130 may process a series of operations for performing various example embodiments of a method according to various example embodiments by controlling other elements included in the electronic apparatus 100. The at least one processor 130 may include at least one of a RAM, a ROM, a CPU, a graphic processing unit (GPU) and a bus. The RAM, ROM, CPU and GPU, etc. may be connected to each other via a bus. The CPU accesses the memory and performs booting using the O/S stored in the memory. Further, the processor performs various operations using various programs, contents, data, etc. stored in the memory. The ROM stores an instruction set for booting the system, and the like. For example, when a turn-on instruction is input and power is supplied to the electronic apparatus 100, the CPU may copy the OS stored in the memory to the RAM according to the instruction stored in the ROM, and boot the system by executing the OS. When booting is completed, the CPU copies various programs stored in the memory to the RAM, and executes the programs copied to the RAM to perform various operations. When the booting of the electronic apparatus 100 is completed, the GPU displays the UI screen in the area of the display. Specifically, the GPU may generate a screen on which an electronic document including various objects such as contents, icons, and menus is displayed. The GPU calculates coordinate values at which each object is to be displayed according to the layout of the screen, and values of properties such as, shape values, size values, color, etc. Further, the GPU may generate screens of various layouts including objects based on the calculated property values. The screen generated by the GPU may be provided to the display and displayed in each area of the display.

The transceiver 140 may transmit information stored in a storage unit (not illustrated) of the electronic apparatus 100 or information processed by the processor 130 to another electronic apparatus, and the transceiver 140 may receive information from another electronic apparatus to the electronic apparatus 100.

The transceiver 140 may perform communication with relays such as various types of electronic apparatuses and satellites according to various types of communication methods. According to an example embodiment, the transceiver 140 may include various hardware for implementing a communication technology according to a modulation type in satellite communication such as binary phase-shift keying (BPSK), quadrature phase-shift keying (QPSK), offset quadrature phase-shift keying (OQPSK), 8PSK and quadrature amplitude modulation (QAM) (for example, 16QAM). According to an example embodiment, the transceiver 140 may include various hardware for performing wireless communication of various frequency bands such as UHF band, S band, X band and Ka band.

According to an example embodiment, the transceiver 140 may include at least one of a Wi-Fi chip, a Bluetooth chip, a wireless communication chip and a near field communication (NFC) chip. The Wi-Fi chip and the Bluetooth chip may perform communication using a Wi-Fi method and a Bluetooth method, respectively. In the case of using the Wi-Fi chip or the Bluetooth chip, various types of connection information such as an SSID and a session key are first transmitted and received, and then various types of information can be transmitted and received after communication connection using the same. The wireless communication chip refers to a chip that performs communication according to various communication standards such as IEEE, Zigbee, 3rd Generation (3G), 3rd Generation Partnership Project (3GPP), and Long Term Evolution (LTE). The NFC chip refers to a chip operating in an NFC method using a 13.56 MHz band among various RF-ID frequency bands such as 135 kHz, 13.56 MHZ, 433 MHZ, 860~960 MHz, 2.45 GHz.

According to an example embodiment, data modulated or demodulated by the transceiver 140 may be transmitted to the receiving end side through the antenna 120 or received by the receiving end side.

According to an example embodiment, the electronic apparatus 100 may further include a separate relay location tracking apparatus 150 for tracking the location of the small relay in order to implement communication using communication systems using the small relay.

According to an example embodiment, a relay receiving the uplink beam of the electronic apparatus 100 may be a relay for LEO satellite communications.

According to an example embodiment, the relay location tracking apparatus 150 may be an apparatus implemented by various technologies for obtaining information on at least one of information on latitude, longitude and altitude where the relay satellite is located and information on a direction in 3D determined based on the electronic apparatus 100. For example, the relay location tracking apparatus 150 may be an apparatus for obtaining direction information about the relay based on the electronic apparatus 100 based on the level of a beacon signal received from the relay. However, the description on the relay location tracking apparatus 150 is only for describing the features, and thus features of the relay location tracking apparatus 150 of the present disclosure are not limited to the descriptions above. Thus, in the present disclosure, it may be understood that the relay location tracking apparatus 150 is implemented through various techniques for obtaining information necessary to perform beam shaping based on the location of a relay and direct an antenna to the relay.

Figure 2:
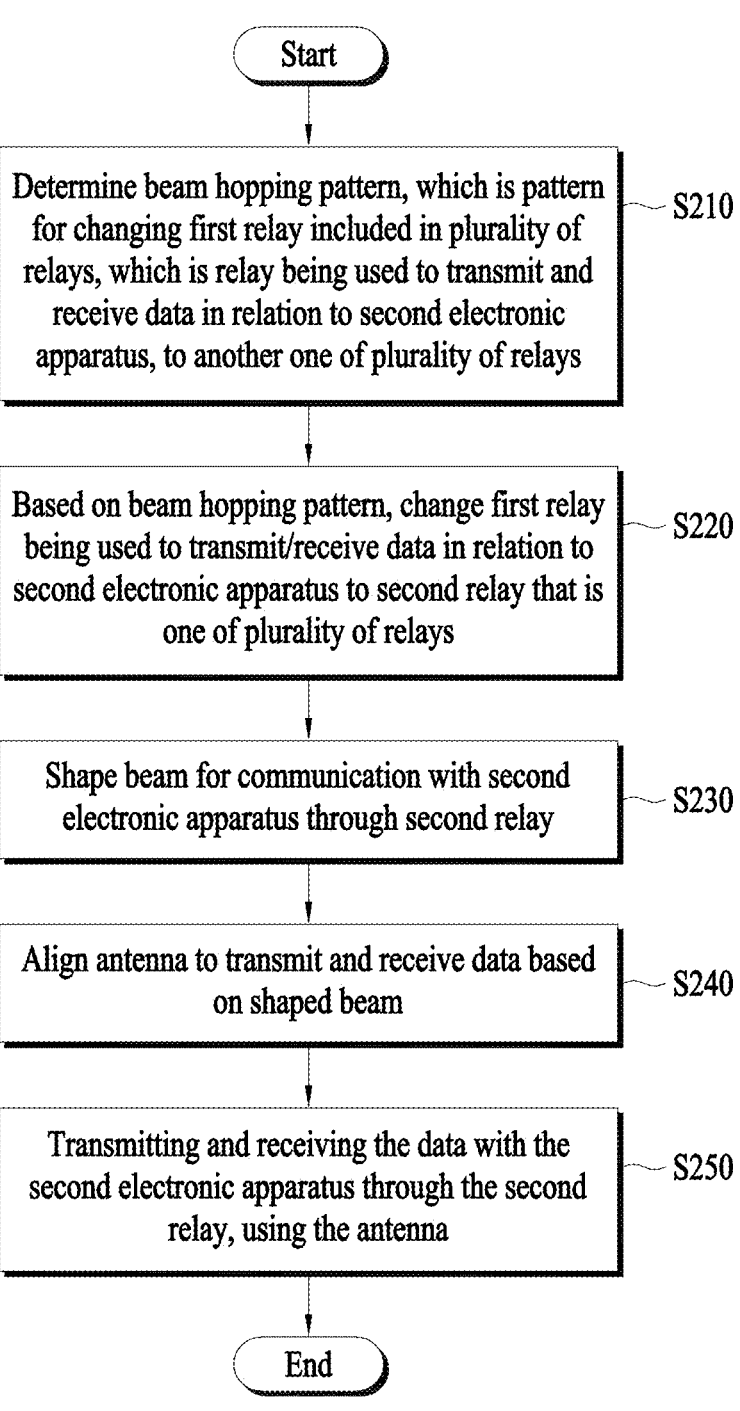
FIG. 2 is a flowchart illustrating a method for an electronic apparatus to perform communication through a communication system implemented using a plurality of relays according to an example embodiment.

FIG. 2 is a flowchart illustrating a method for the electronic apparatus 100 to perform communication through a communication system implemented using a plurality of relays according to an example embodiment. Hereinafter, for convenience of description, the electronic apparatus 100 is referred to as a first electronic apparatus, and an apparatus at a receiving end that receives a signal transmitted from the electronic apparatus 100 is referred to as a second electronic apparatus. According to an example embodiment, the second electronic apparatus may perform wireless communication through a method operated by the electronic apparatus 100, and for this, the second electronic apparatus may include at least some of the same elements as the electronic apparatus 100.

According to an example embodiment, in operation S210, the first electronic apparatus 100 may determine a beam hopping pattern, which is a pattern for changing a first relay included in a plurality of relays, which is a relay being used to transmit and receive data in relation to the second electronic apparatus, to another one relay among the plurality of relays.

According to an example embodiment, the beam hopping pattern may include information about a pattern for changing a first relay being used to transmit/receive data in relation to the first electronic apparatus and the second electronic apparatus to another one of the plurality of relays. According to an example embodiment, the first electronic apparatus 100 may share a predetermined beam hopping pattern with the second electronic apparatus, and information on the shared beam hopping pattern may be stored in various types of storages (HDD, SSD, RAM, ROM, and a server interworking with the first electronic apparatus 100 and the second electronic apparatus) utilized by the first electronic apparatus 100 and the second electronic apparatus.

The predetermined beam hopping pattern according to the example embodiment may include various pieces of information about usage patterns of a plurality of relays used for communication between the first electronic apparatus 100 and the second electronic apparatus. In other words, in wireless communication with the second electronic apparatus, the first electronic apparatus 100 may change a relay in use to another relay based on the beam hopping pattern, and the relay changing may be based on the beam hopping pattern shared with the second electronic apparatus. Hereinafter, the flowchart of FIG. 2 will be described with reference to FIG. 3 in detail.

Figure 3:
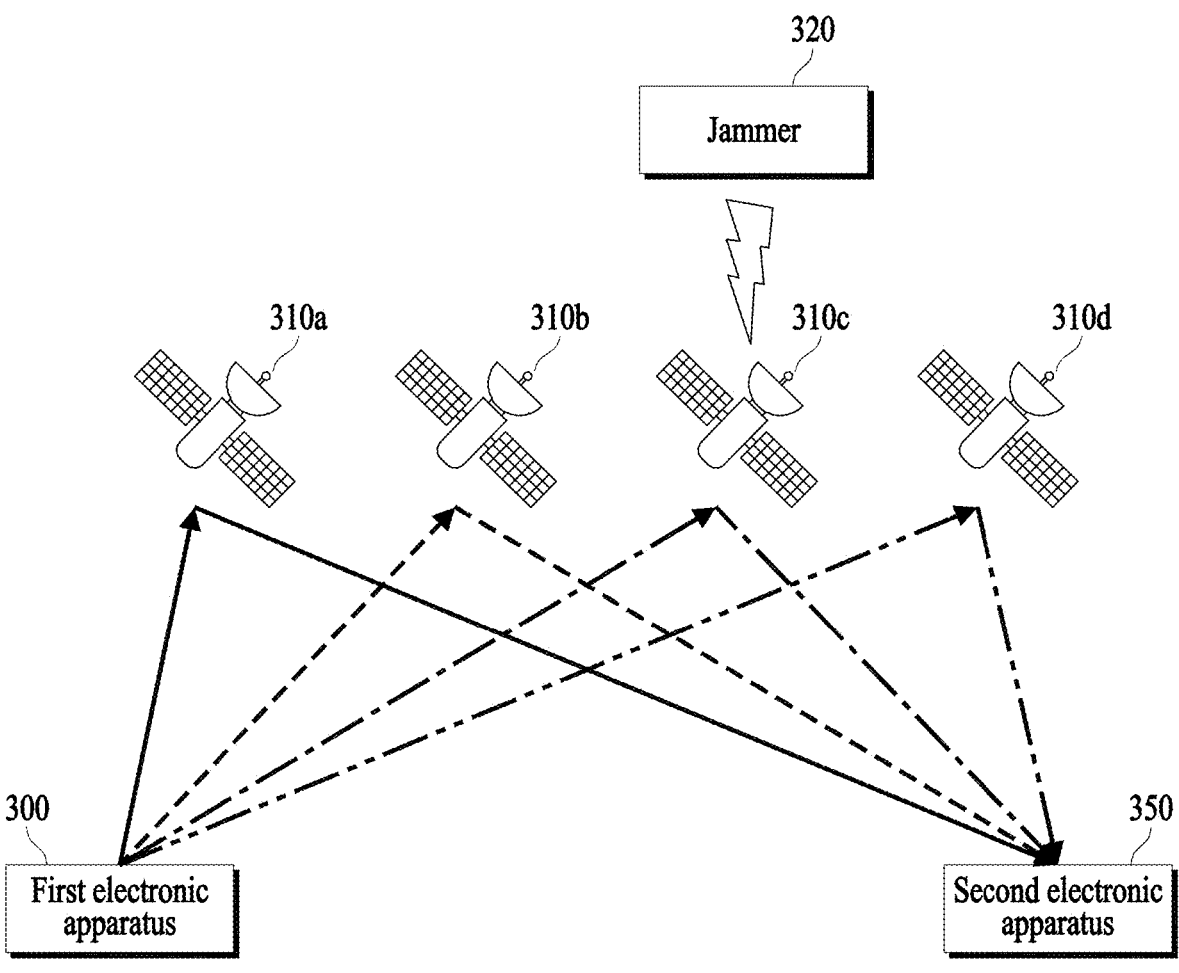
FIG. 3 is a diagram for explaining a method of performing communication between electronic apparatuses through beam hopping among a plurality of relays in a communication environment with a jammer interfering the communication, according to example embodiments.

FIG. 3 is a diagram for explaining a method of performing communication between a first electronic apparatus 300 and a second electronic apparatus 350 through beam hopping among a plurality of relays in a communication environment with a jammer interfering the communication, according to example embodiments. The first electronic apparatus 300 and/or the second electronic apparatus 350 illustrated in FIG. 3 may include at least some of the same elements as the electronic apparatus 100 illustrated in FIG. 1.

Referring to FIG. 3, according to an example embodiment, the first electronic apparatus 300 may use a plurality of relays 310a, 310b, 310c and 310d to communicate with the second electronic apparatus 350. According to an example embodiment, the plurality of relays 310a, 310b, 310c and 310d may include a relay, which is a small and inexpensive relay to which the latest anti-jamming techniques are difficult to apply. According to an example embodiment, the first electronic apparatus 300 may communicate with the second electronic apparatus 350 through one of the plurality of relays (for example, the relay 310a).

According to an example embodiment, with regard to the relays used for communication between the first electronic apparatus 300 and the second electronic apparatus 350, process of changing to one of the relays 310b, 310c and 310d which is different from the currently used relay (for example, the relay 310a) among the plurality of relays 310a, 310b, 310c and 310d based on a beam hopping pattern may be repeated.

According to an example embodiment, the currently used relay (for example, the relay 310c) may receive a jamming attack from a jammer 320, and due to the jamming attack, wireless communication using the relay 310c may be impossible. The first electronic apparatus 300 and the second electronic apparatus 350 may perform an anti-jamming function by performing wireless communication, by performing beam hopping to a second relay (for example, the relay 310a, the relay 310b or the relay 310d) that is a relay different from the first relay 310c currently being used based on the shared beam hopping pattern.

In operation S220, according to an example embodiment, based on the beam hopping pattern, the first electronic apparatus 300 may change the first relay being used to transmit/receive data in relation to the second electronic apparatus to the second relay that is one of the plurality of relays. The first electronic apparatus 300 may determine a relay to be used in the next order based on the beam hopping pattern and determine to use the determined relay.

In operation S230, according to an example embodiment, the first electronic apparatus 300 may shape a beam for communication with the second electronic apparatus 350 through the second relay. According to an example embodiment, the beam shaping process may include shaping the uplink beam by the first electronic apparatus 300 to direct the beam to the second relay for communication with the second electronic apparatus 350 through the antenna 120. The beam shaping method may include various beam shaping methods including digital, analog and hybrid beam shaping methods, and thus a detailed explanation is omitted.

In operation S240, the first electronic apparatus 300 may align the antenna 120 to transmit and receive data based on the beam shaped in operation S230. In other words, since the beam shaped by the beam shaping module 110 is directional, the antenna 120 may be aligned in an appropriate direction to transmit the beam to the second relay 310*b*.

According to an example embodiment, the first electronic apparatus 300 may change a relay to be used for transmitting and receiving data from the first relay (for example, the relay 310*a*) to the second relay (for example, the relay 310*b*) based on the beam hopping pattern, and then the electronic apparatus 300 may control the antenna 120 and the beam shaping module 110 to perform uplink beam hopping, in order for the uplink beam to be transmitted toward the second relay 310*b* instead of toward the first relay 310*a* through the antenna for the uplink beam hopping. According to an example embodiment, the second electronic apparatus 350 may control the antenna 120 and the beam shaping module 110 in order that the uplink beam hopping is performed by the first electronic apparatus 300 and a downlink beam is transmitted to the relay (for example, the relay 310*b*) through the antenna to receive the beam transmitted to the relay (for example, the relay 310*b*).

According to an example embodiment, the second electronic apparatus 350 receiving data based on the uplink beam by the first electronic apparatus 300 may transmit the uplink beam to transmit data to the first electronic apparatus 300. In this case, the first electronic apparatus 300 may transmit the downlink beam for receiving data included in the beam transmitted from the second electronic apparatus 300. According to an example embodiment, the beam hopping pattern based on the uplink beam by the first electronic apparatus 300 and the downlink beam by the second electronic apparatus 350 may be shared identically to a beam hopping pattern based on the uplink beam by the second electronic apparatus 350 and the downlink beam by the first electronic apparatus 300.

According to an example embodiment, the first electronic apparatus 300 and the second electronic apparatus 350 may share beam hopping timing as well as the beam hopping pattern in order to perform wireless communication based on the beam hopping pattern. Therefore, the electronic apparatus 300 and the second electronic apparatus 350 may defend against jamming attacks through the beam hopping that changes relays to be used for wireless communication in an order matching the beam hopping pattern at a predetermined and shared timing.

According to an example embodiment, the timing to hop the beam may be a timing corresponding to one of a time point at which the first electronic apparatus 300 changes the relay for communicating with the second electronic apparatus 350 from the currently used first relay to the second relay, a time point of a beam shaping for transmitting a beam to the second relay, a time point to direct the antenna to direct the shaped beam to the second relay and a time point to transmit data using a beam transmitted through the directed antenna.

According to an example embodiment, each timing at which an uplink beam by the first electronic apparatus 300 and a downlink beam by the second electronic apparatus 350 are transmitted may be shared in advance. The timing for the uplink beam and the time for the downlink beam are not necessarily the same, and each timing may be different. In other words, each timing at which the uplink beam by the first electronic apparatus 300 and the down link beam by the second electronic apparatus 350 are transmitted may be a combination of various timings shared in advance so that the first electronic apparatus 300 and the second electronic apparatus 350 can identify an uplink beam and a downlink beam from each other.

In operation S250, the first electronic apparatus 300 may transmit and receive data with the second electronic apparatus 350 through the second relay 310*b* by transmitting the shaped beam through the aligned antenna 120 according to an example embodiment. According to an example embodiment, data to be transmitted/received may be accompanied by a shaped beam and transmitted to the second electronic apparatus 350 via the second relay 310*b*. In the present disclosure, since a method of transmitting and receiving data through beam shaping may include a method used in various satellite relay communication technologies, a detailed description thereof will be omitted.

According to an example embodiment, different from each other may be a relay that receives an uplink beam transmitted by the first electronic apparatus 300 based on the beam hopping pattern and a relay that receives an uplink beam transmitted based on the beam hopping pattern by the second electronic apparatus 350 receiving data from the first electronic apparatus 300. In other words, the second electronic apparatus 350 receiving data through the first relay (for example, the relay 310*a*) receiving the uplink beam transmitted by the first electronic apparatus 300 may transmit data to the first electronic apparatus 300 through the uplink beam, and the uplink beam transmitted by the second electronic apparatus 350 based on the beam hopping pattern may be the second relay (for example, the relay 310*b*). This may be embodied according to that the relays determined to be used based on the beam hopping pattern at the time of transmitting the uplink beams of the first electronic apparatus 300 and the second electronic apparatus 350 are different from each other. In this case, even if the first relay 310*a* is subjected to a jamming attack by the jammer 320 after transmitting the uplink beam of the first electronic apparatus 300, the uplink beam of the second electronic apparatus 350 and/or the downlink beam of the first electronic apparatus 300 may be directed to another relay (or, the second relay 310*b*) not subjected to the jamming attack, and thus the jamming attack may be effectively defended against.

According to an example embodiment, a beam hopping pattern for changing the plurality of relays 310*a*, 310*b*, 310*c* and 310*d* to be used for wireless communication may be continuously repeated. In other words, if the repetition period of the beam hopping pattern is 4 hours, the beam hopping pattern may be restarted every 4 hours.

According to an example embodiment, the first electronic apparatus 300 may obtain various information about the second electronic apparatus 350 to transmit data. According to an example embodiment, the first electronic apparatus 300 may obtain various information including an identifier for the second electronic apparatus 350 and/or location information of the second electronic apparatus 350.

According to an example embodiment, the first electronic apparatus 300 may obtain various pieces of information about a relay to communicate with the second electronic apparatus 350 to transmit data. According to an example embodiment, the first electronic apparatus 300 may determine a second relay, which is a relay where the beam is to be hopped, based on the beam hopping pattern. According to an example embodiment, the first electronic apparatus 300 may obtain various pieces of information including an identifier for the second relay (for example, the relay 310*b*) among the plurality of relays 310*a*, 31*b*, 310*c* and 310*d* and location information of the second relay 310*b*. According to an example embodiment, the identifiers of the plurality of relays 310*a*, 310*b*, 310*c* and 310*d* may include various types of identifiers (for example, an identifier of a transponder on satellite communication systems) for identifying satellite communication relays in the communication field. According to an example embodiment, the location information of the plurality of relays 310*a*, 310*b*, 310*c* and 310*d* may include at least one of information on latitude, longitude and altitude of each of the plurality of relays 310*a*, 310*b*, 310*c* and 310*d* obtained through the relay location tracking apparatus 150, and information on direction in 3D determined based on the electronic apparatus 100.

According to an example embodiment, the plurality of relays 310*a*, 310*b*, 310*c* and 310*d* may be a relay for LEO satellite communications. According to an example embodiment, a LEO satellite may be a satellite floating at a predetermined height (for example, from 200 to 6,000 km above the earth's orbit). According to an example embodiment, the plurality of relays 310*a*, 310*b*, 310*c* and 310*d* may be relays on a geostationary orbit that rotate with the earth and appear to be at a fixed position when observed on the earth.

The method of the present disclosure may be executed through software. When executed in software, the component parts of the present disclosure are code segments which perform necessary tasks. The program or the code segments may be stored on a processor-readable medium.

The computer-readable recording medium includes all kinds of recording apparatuses in which data readable by a computer system is stored. Examples of the computer-readable recording apparatus include a read only memory (ROM), a random access memory (RAM), a compact disc (CD)-ROM, a digital versatile disc (DVD)±ROM, DVD-RAM, a magnetic tape, a floppy disk, a hard disk, and an optical data storage apparatus. The computer-readable recording medium may also be distributed in a computer apparatus connected via a network so that a computer-readable code may be stored and executed in a distributed manner.

The above-described present disclosure may be variously substituted, modified, and changed within the technical spirit of the present disclosure without departing from the scope by those skilled in the art to which the present disclosure pertains and is not limited to the above-described example embodiments and the accompanying drawings. In addition, the example embodiments described herein may not be limitedly applied and all or some of each embodiment may be selectively combined so that various modifications may be made.

For those of ordinary skill in the art to which the present disclosure pertains, various substitutions, modifications and changes are possible within the scope of the example embodiments without departing from the technical spirit of the example embodiment. Thus, the present disclosure is not limited to the above-described example embodiments and the accompanying drawings.

What is claimed is:

1. An electronic apparatus of performing communication through a communication system implemented using a plurality of relays, the electronic apparatus comprising:

a beam shaping module that shapes a beam to transmit and/or receive data;

an antenna aligned to transmit and receive a beam shaped by the beam shaping module;

a transceiver to transmit and/or receive the data in relation to another electronic apparatus through the antenna; and at least one processor configured to:

determine a beam hopping pattern between the plurality of relays;

change a relay, which is used to transmit and receive data in relation to the another electronic apparatus sharing the beam hopping pattern, from a first relay included in the plurality of relays to a second relay included in the plurality of relays based on the beam hopping pattern; and control at least one of the antenna, the beam shaping module and the transceiver to transmit and receive data through the second relay, wherein the electronic apparatus further comprises a relay location tracking apparatus that obtains location information of the plurality of relays, wherein the at least one processor controls at least one of the beam shaping module and the antenna based on the location information obtained through the relay location tracking apparatus and the beam hopping pattern, wherein the beam hopping pattern used to communicate with the another electronic apparatus and timing at which a beam hops according to the beam hopping pattern are shared with the another electronic apparatus, and wherein the at least one processor determines one relay among the plurality of relays as the second relay based on the beam hopping pattern, and controls the beam shaping module in order to shape a beam based on at least one of an identifier of the second relay and location information of the second relay.

2. The electronic apparatus of claim 1, wherein the at least one processor controls at least one of the antenna and the beam shaping module to transmit a beam to perform uplink beam hopping.

3. The electronic apparatus of claim 2, wherein the uplink beam hopping changes a relay for transmitting the data to the another electronic apparatus, from the first relay to the second relay based on the beam hopping pattern.

4. The electronic apparatus of claim 1, wherein the at least one processor controls the antenna to direct a beam shaped by the beam shaping module to the second relay.

5. The electronic apparatus of claim 4, wherein the at least one processor controls the transceiver to transmit the data to the another electronic apparatus through the antenna directing the second relay.

6. The electronic apparatus of claim 1, wherein the antenna is a phased array antenna.

7. The electronic apparatus of claim 1, wherein the plurality of relays are relays for low earth orbit (LEO) satellite communications.

8. A method for a first electronic apparatus to perform communication through a communication system implemented using a plurality of relays, the method comprising:

determining a beam hopping pattern that is a pattern for changing a first relay, which is a relay used to transmit and receive data in relation to a second electronic apparatus and included in the plurality of relays, to another relay included in the plurality of relays;

based on the beam hopping pattern, changing the first relay, which is a relay used to transmit and receive data in relation to the second electronic apparatus, to a second relay that is one relay among the plurality of relays;

shaping a beam for communication with the second electronic apparatus through the second relay;

aligning an antenna to transmit and receive data based on the shaped beam; and transmitting and receiving with the second electronic apparatus through the second relay, using the antenna, wherein the beam hopping pattern is shared with the second electronic apparatus, wherein the first electronic apparatus comprises a relay location tracking apparatus that obtains location information of the plurality of relays, and a beam shaping module that shapes the beam, wherein the first electronic apparatus controls at least one of the beam shaping module and the antenna based on the location information obtained through the relay location tracking apparatus and the beam hopping pattern, wherein the beam hopping pattern used to communicate with the second electronic apparatus and timing at which a beam hops according to the beam hopping pattern are shared with the second electronic apparatus, and wherein the first electronic apparatus determines one relay among the plurality of relays as the second relay based on the beam hopping pattern, and controls the beam shaping module in order to shape a beam based on at least one of an identifier of the second relay and location information of the second relay.

9. A non-transitory computer readable recording medium having a computer program for executing the method of claim 8.

* * * * *